Sept. 8, 1942.    E. MICHELSEN    2,295,286
MULTI-POLE SYNCHRONOUS MOTOR
Filed May 1, 1941
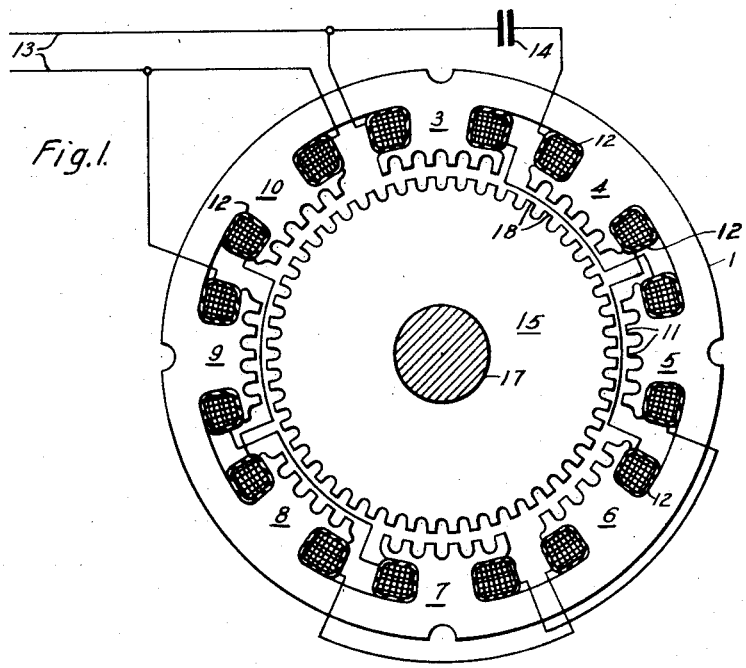
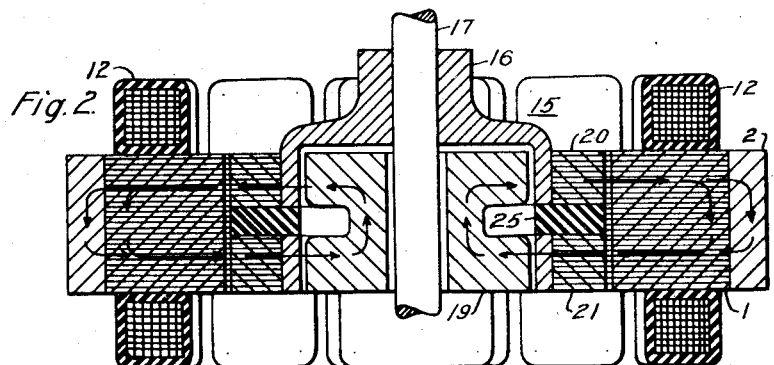
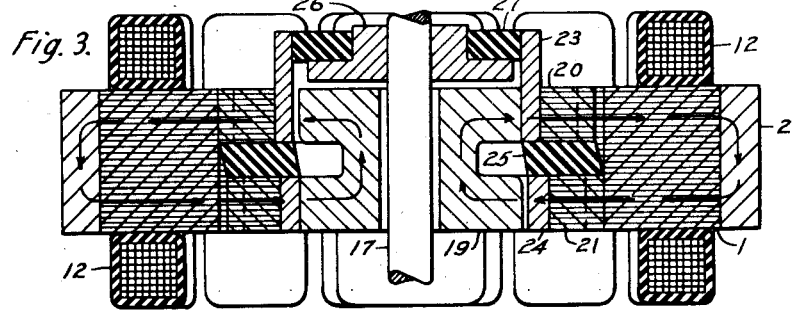
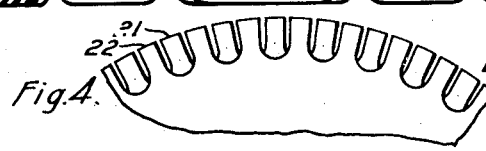
WITNESSES:
H. F. Susser.
F. P. Lyle
INVENTOR
Eberhard Michelsen.
BY O. B. Buchanan
ATTORNEY Patented Sept. 8, 1942

2,295,286

UNITED STATES PATENT OFFICE 2,295,286

MULTIPOLE SYNCHRONOUS MOTOR

Eberhard Michelsen, Frohnau, Mark, Germany, assignor to Westinghouse Electric & Manufacturing Company, East Pittsburgh, Pa., a corporation of Pennsylvania Application May 1, 1941, Serial No. 391,245
In Germany December 30, 1939

6 Claims. (Cl. 172—120)

The present invention relates to synchronous motors, and, more particularly, to multi-pole synchronous motors of relatively small size.

A principal object of the invention is to provide an improved low-speed, self-starting synchronous motor of the type which utilizes a permanent magnet to supply the necessary magnetization of the rotor. In motors of this type, as previously built, the magnetic path for the flux of the permanent magnet has been relatively long, usually extending from the magnet across an air gap to the rotor, and then across another air gap to the stator, and through the frame of the motor back to the magnet. Because of this long path, the magnetic losses are relatively high, and the reluctance of the magnetic circuit is also high, so that a relatively large magnet is required to obtain the desired total flux. With this arrangement, the magnetic flux from the permanent magnet also links the stator windings, which are excited with alternating current, which is undesirable because of the damping effect on the stator flux.

A more specific object of the invention, therefore, is to provide a multi-pole, self-starting synchronous motor in which the magnetic path for the permanent magnet flux is relatively short, and in which this flux does not link the stator windings.

A further object of the invention is to provide a multi-pole synchronous motor of the type described above, in which the rotor member is divided into two axially separated sections which are magnetically insulated from each other, and through which the flux of the permanent magnet passes in opposite directions, so that the flux returns to the magnet through the rotor without having to pass through the frame of the motor.

A still further object of the invention is to provide a multi-pole synchronous motor of the type described above in which the rotor is divided into two axially spaced sections which are resiliently mounted to permit movement of the two sections with respect to each other and to the shaft, so that the air gap between the rotor and stator is reduced when the motor is in operation.

Other objects and advantages of the invention will be apparent from the following detailed description, taken in connection with the accompanying drawing, in which:

Figure 1 is a somewhat diagrammatic plan view of a multi-pole synchronous motor;

Fig. 2 is a vertical sectional view, showing the rotor and stator members of the motor;

Fig. 3 is a view similar to Fig. 2 showing a modified embodiment of the invention; and Fig. 4 is a fragmentary plan view of a rotor member on an enlarged scale.

The particular motor shown in Figures 1 and 2 for the purpose of illustrating the invention is similar to the multi-pole synchronous motor disclosed in my copending application Serial No. 330,071, filed April 17, 1940, and assigned to the Westinghouse Electric & Manufacturing Company, although the invention may also be embodied in other types of small permanent magnet synchronous motors. This motor has a laminated stator core member 1 which is supported in a cylindrical frame 2. The stator member 1 has a plurality of salient pole portions 3, 4, 5, 6, 7, 8, 9 and 10 extending radially inward, and each of these pole portions has a plurality of teeth 11 on its peripheral surface. The pitch of the teeth 11 is the same on all of the poles, and the width of each tooth is preferably equal to half the tooth pitch, or in other words, the spaces between the teeth are equal in width to the teeth. The teeth 11 on each pole portion are uniformly spaced, but the teeth on successive pole portions are displaced from the positions corresponding to those of the preceding pole by a distance equal to one-half the width of a tooth, as clearly shown in the drawing.

Each pole portion has an exciting coil 12 wound on it and the coils 12 are connected together to form two separate windings. Thus the coils of the pole portions 3, 5, 7 and 9 are connected in series to form one winding, the coils of the pole portions 3 and 7 being connected in opposition to the coils of the pole portions 5 and 9, while the coils 12 of the pole portions 4, 6, 8 and 10 are connected in series to form a second winding, with the coils of the pole portions 4 and 8 connected in opposition to those of the pole portions 6 and 10. In operation, the two stator windings are excited with alternating currents which are approximately 90° out of phase. This may conveniently be done, as shown in Fig. 1, by connecting the two windings in parallel to a single-phase supply line 13, with a capacitor 14 connected in series with one of the windings.

The rotor members 15 comprises a laminated core mounted on a hollow supporting spider 16 which is secured to the shaft 17. The shaft 17 may be supported in suitable bearings in a frame of any suitable construction. The rotor 15 is provided with a plurality of teeth 18 uniformly distributed about its entire circumference, and the pitch of the teeth 18 is preferably the same as that of the stator teeth 11 previously described. A stationary permanent magnet 19 is mounted within the hollow spider 16, so that its magnetic field extends through the rotor and stator members. If desired, any other suitable means of providing a substantially constant, unidirectional magnetic field might be utilized, such as a winding supplied with direct current.

The operation of this motor may best be understood by assuming the design to be such that the air gap flux produced by the permanent magnet 19 is approximately equal to the maximum value of the flux produced by the exciting coils 12, which are supplied with alternating current. At the instant when the exciting current in the coils of the pole portions 3, 5, 7 and 9 is passing through its maximum value, the flux produced by these coils is equal to the air gap flux produced by the permanent magnet 19. If we assume that the flux of the coils on the pole portions 3 and 7 is in the same direction as the permanent magnet flux, the air gap flux under these pole portions will be approximately equal to twice the flux of the permanent magnet 19. At the same instant, the flux of the coils on the pole pieces 5 and 9 will be opposite in direction and of equal magnitude, so that the resultant flux under these pole portions will be substantially zero. Under these conditions, the rotor will tend to move to a position of minimum magnetic reluctance for the magnetic path through the pole portions 3 and 7, and will take up the position shown in Fig. 1, with the teeth 18 coinciding in position with the teeth of the pole portions 3 and 7. At this same instant, the current in the exciting coils of the pole portions 4, 6, 8 and 10 will be passing through zero, since it is 90° out of phase with the current in the coils of the other pole portions, and the only flux under these poles, therefore, will be that of the permanent magnet, which is radially directed and of equal magnitude under all of these pole portions, so that it has no effect on the motion of the rotor member.

A quarter of a cycle later, the current in the coils of the even numbered pole portions will be passing through its maximum value, while the current in the coils of the odd numbered pole portions will be passing through zero. Thus, the position of maximum flux will have shifted to either the poles 4 and 8 or the poles 6 and 10, depending on the direction of phase rotation, and the rotor member will accordingly move sufficiently to bring its teeth into the position of minimum reluctance for this new path, which, as will be clear from Fig. 1, will require a movement of the rotor of half a tooth width because of the relative displacement of the teeth of successive pole portions. In this way, the position of maximum magnetic flux will move around the motor and the rotor member will follow it, moving half a tooth width for each quarter cycle of the alternating current supply, so that the motor will rotate at a slow speed determined by the frequency of the supply and the number of teeth on the rotor.

In motors of this general type, as previously built and as shown, for example, in the motor disclosed in the above-mentioned copending application, the magnetic path for the flux of the permanent magnet has extended through the rotor and stator members and then through the frame of the machine back to the magnet. This construction results in a relatively long path, which necessarily has high reluctance and involves undesirably large magnetic losses. In addition, with this construction, the permanent magnet flux links the stator windings, and thus a damping effect is produced which tends to diminish the field strength of these coils, which is obviously undesirable. In order to avoid these difficulties, the present invention provides a construction for the rotor member which provides a very much shortened magnetic circuit for the flux of the permanent magnet. Thus, as shown in Fig. 2, the laminated core of the rotor 15 is divided into two sections 20 and 21, which are spaced apart axially of the motor and are separated by an annular spacer 22 of non-magnetic material, such as aluminum or brass. The magnet 19 is shaped so that its poles lie opposite the separated sections 20 and 21 of the rotor member, respectively, and the path of the magnetic flux from the magnet 19 then extends across a short air gap, through the rotor core section 20, across the air gap between the rotor and stator, through the stator core 1, and to some extent through the frame 2, and then back across the air gap and through the other rotor core section 21 back to the magnet, as shown by the arrows in Fig. 2. It will be seen that a very short magnetic path is provided which has relatively low reluctance, since the two air gaps can be made quite short and the total length of the magnetic circuit is very much less than that provided in previous constructions, so that the magnetic losses are greatly reduced and a greater air gap flux can be obtained from a given permanent magnet. The flux which passes through the rotor and stator in this way does not link the exciting coils 12 of the stator, so that there is no damping effect on the flux produced by them, which improves the operation of the motor.

It will be observed that the flux passes through the two sections 20 and 21 of the rotor core in opposite directions, and for this reason it is necessary to displace the teeth on the two sections a distance equal to the width of a tooth, as shown in Fig. 4, so that the teeth of one section of the rotor are opposite the spaces between the teeth of the other section. By this arrangement, the relation of the rotor teeth of both sections to the fluxes in the air gap and to the stator teeth is made such that the motor operates in the manner described above.

Since the flux of the permanent magnet passes twice across each of the two air gaps, i. e., the air gap between the rotor and stator cores and the air gap between the permanent magnet 19 and the spider 16, it is desirable to reduce the length of these air gaps as much as possible in order to keep the reluctance of the magnetic circuit low. By using the construction shown in Fig. 3, one of these air gaps can, in effect, be eliminated, thus materially decreasing the reluctance. In this construction, the two halves 20 and 21 of the rotor core are mounted on supporting sleeves 23 and 24, respectively, and the two sections of the rotor are connected together by a spacer 25 of resilient non-magnetic material, such as rubber. The upper sleeve 23 is resiliently mounted on a hub 26 on the shaft 17 by means of a ring 27 of rubber or other resilient material. The construction of the two sections 20 and 21 of the rotor and of the stator and the operation of the motor are the same as those described above.

In this embodiment of the invention, it will be apparent that when the motor is in operation, the two sections 20 and 21 of the rotor can move relative to the shaft independently of each other, and they will be drawn into contact with the stator core by the magnetic force at the points of maximum flux, as shown in Fig. 3, thus substantially eliminating one of the air gaps. As the position of maximum flow moves around the motor, the rotor sections will tend to roll around the inside of the stator core, thus keeping the reluctance of the magnetic path for the flux of the magnet 19 substantially constant and relatively low.

It should now be apparent that a multi-pole, self-starting synchronous motor using a permanent magnet has been provided which is of relatively simple construction, and which is a material improvement over previous similar types of motors in that the magnetic path for the permanent magnet flux has been materially shortened in length, thus reducing the magnetic losses and lowering the reluctance of the path. This results in a considerable improvement in the performance of the motor. It should be understood that the invention is not restricted to the particular construction or type of motor shown and described for the purpose of illustration, but is applicable generally to any type of small motor using a permanent magnet or equivalent device as a source of unidirectional magnetic flux.

It is to be understood, therefore, that the invention is not limited to the exact details of construction shown, but in its broadest aspects it includes all equivalent modifications and embodiments which come within the scope of the appended claims.

I claim as my invention:

1. An electric motor having a stator member with a plurality of salient pole portions, each of said pole portions having teeth on its peripheral surface and the teeth of successive pole portions being relatively displaced circumferentially one-half the width of a tooth, a rotor member having uniformly spaced teeth around its entire circumference, the pitch of said rotor teeth being the same as that of the stator teeth, said rotor member being divided into two axially spaced sections separated by a non-magnetic spacer, said stator member extending axially past both sections of the rotor member, means for producing a substantially constant, unidirectional magnetic field passing radially through the rotor and stator teeth, and means for producing alternating magnetic fields in the stator pole portions, the magnetic fields in adjacent pole portions being substantially 90° out of phase.

2. An electric motor having a stator member with a plurality of salient pole portions, each of said pole portions having teeth on its peripheral surface and the teeth of successive pole portions being relatively displaced circumferentially one-half the width of a tooth, a rotor member having uniformly spaced teeth around its entire circumference, the pitch of said rotor teeth being the same as that of the stator teeth, said rotor member being divided into two axially spaced sections separated by a non-magnetic spacer, said stator member extending axially past both sections of the rotor member, means for producing a substantially constant, unidirectional magnetic field passing radially through the rotor and stator teeth, said magnetic field being in opposite directions in the two sections of the rotor member, and means for producing alternating magnetic fields in the stator pole portions, the magnetic fields in adjacent pole portions being substantially 90° out of phase.

3. An electric motor having a stator member with a plurality of salient pole portions, each of said pole portions having teeth on its peripheral surface and the teeth of successive pole portions being relatively displaced circumferentially one-half the width of a tooth, a rotor member having uniformly spaced teeth around its entire circumference, the pitch of said rotor teeth being the same as that of the stator teeth, said rotor member being divided into two axially spaced sections separated by a non-magnetic spacer, the teeth of the two sections of the rotor member being circumferentially displaced a distance equal to the width of a tooth, said stator member extending axially past both sections of the rotor member, means for producing a substantially constant, unidirectional magnetic field passing radially through the rotor and stator teeth, said magnetic field being in opposite directions in the two sections of the rotor member, and means for producing alternating magnetic fields in the stator pole portions, the magnetic fields in adjacent pole portions being substantially 90° out of phase.

4. An electric motor having a stator member with a plurality of salient pole portions, each of said pole portions having teeth on its peripheral surface and the teeth of successive pole portions being relatively displaced circumferentially one-half the width of a tooth, a rotor member having uniformly spaced teeth around its entire circumference, the pitch of said rotor teeth being the same as that of the stator teeth, said rotor member being divided into two axially spaced sections separated by a non-magnetic spacer, the teeth of the two sections of the rotor member being circumferentially displaced a distance equal to the width of a tooth, said stator member extending axially past both sections of the rotor member, a permanent magnet mounted centrally of the rotor member to provide a substantially constant, unidirectional magnetic field passing radially through the stator and rotor teeth, said magnet being disposed so that its magnetic field is in opposite directions in the two sections of the rotor member, and means for producing alternating magnetic fields in the stator pole portions, the magnetic fields in adjacent pole portions being substantially 90° out of phase.

5. An electric motor having a stator member with a plurality of salient pole portions, each of said pole portions having teeth on its peripheral surface and the teeth of successive pole portions being relatively displaced circumferentially one-half the width of a tooth, a rotor member having uniformly spaced teeth around its entire circumference, the pitch of said rotor teeth being the same as that of the stator teeth, said rotor member being divided into two axially spaced sections, said sections being separated by a spacer of resilient, non-magnetic material and being mounted to permit them to move radially with respect to each other, said stator member extending axially past both sections of the rotor member, means for producing a substantially constant, unidirectional magnetic field passing radially through the rotor and stator teeth, said magnetic field being in opposite directions in the two sections of the rotor member, and means for producing alternating magnetic fields in the stator pole portions, the magnetic fields in adjacent pole portions being substantially 90° out of phase.

6. An electric motor having a stator member with a plurality of salient pole portions, each of said pole portions having teeth on its peripheral surface and the teeth of successive pole portions being relatively displaced circumferentially one-half the width of a tooth, a rotor member having uniformly spaced teeth around its entire circumference, the pitch of said rotor teeth being the same as that of the stator teeth, said rotor member comprising two axially spaced sections resiliently mounted on a shaft and separated by a spacer of resilient non-magnetic material to permit said two sections to move independently relative to the shaft, the teeth of the two sections of the rotor member being circumferentially displaced a distance equal to the width of a tooth, said stator member extending axially past both sections of the rotor member, a permanent magnet mounted centrally of the rotor member to provide a substantially constant, unidirectional magnetic field passing radially through the stator and rotor teeth, said magnet being disposed so that its magnetic field is in opposite directions in the two sections of the rotor member, and means for producing alternating magnetic fields in the stator pole portions, the magnetic fields in adjacent pole portions being substantially 90° out of phase.

EBERHARD MICHELSEN.